United States Patent [19]
Yokoyama et al.

[11] Patent Number: 5,532,908
[45] Date of Patent: Jul. 2, 1996

[54] LIGHTING DEVICE FOR ZIGZAG-OPERATED SHIFT LEVER

[75] Inventors: Yoshinobu Yokoyama; Kenji Suzuki; Yoshiyuki Seki; Shoichi Harada; Etsuo Shimizu, all of Aichi-ken, Japan

[73] Assignee: Kabushiki Kaisha Tokai-Rika-Denki-Seisakusho, Aichi-Ken, Japan

[21] Appl. No.: 454,023

[22] Filed: May 30, 1995

[30] Foreign Application Priority Data

May 31, 1994 [JP] Japan .................... 6-117992

[51] Int. Cl.$^6$ ................................. G01D 11/28
[52] U.S. Cl. .................. 362/30; 362/26; 362/31; 362/330; 362/331; 116/28.1; 116/DIG. 20
[58] Field of Search .................... 116/28.1, 287, 116/DIG. 20, DIG. 21; 362/23, 26, 28–31, 80, 83.3, 61, 330, 331, 327

[56] References Cited

U.S. PATENT DOCUMENTS

| | | | |
|---|---|---|---|
| 2,740,372 | 4/1956 | Sturges | 362/26 |
| 4,137,864 | 2/1979 | Lauper | 116/28.1 |
| 4,765,701 | 8/1988 | Cheslak | 362/26 |
| 4,964,359 | 10/1990 | Richmond | 116/28.1 |
| 4,980,803 | 12/1990 | Richmone et al. | 362/23 |
| 4,991,535 | 2/1991 | Kobayashi et al. | 116/28.1 |
| 5,159,892 | 11/1992 | Hara et al. | 116/28.1 |

FOREIGN PATENT DOCUMENTS 453481   12/1992   Japan .

*Primary Examiner*—James C. Yeung
*Assistant Examiner*—Alan B. Cariaso
*Attorney, Agent, or Firm*—Sixbey Friedman Leedom & Ferguson

[57] ABSTRACT

A lighting device for a zigzag-operated shift lever, wherein an indicator plate is light-transmissible, the indicator plate has a two-layer structure having an upper member, in which the upper surface other than the area of a position indicator is shaded and the position indicator is illuminated by lighting means, and a lower member, in which the light from the lighting means is transmitted to the peripheral portion of a operation groove at the indicator plate so that the peripheral portion of the operation groove is illuminated. A portion of the light from the lighting means passes through the upper member so that the position indicator is illuminated. Because nothing shades the upper surface of the lower member, the remaining portion of the light is repeatedly reflected by the border between the upper and lower members and by the lower surface of the lower member. The light is transmitted to the peripheral portion of the operation groove within the lower member. As a result, the area of the position indicator, the side surfaces of the operation groove at the driver's seat side and the front passenger's seat side are illuminated.

9 Claims, 4 Drawing Sheets

LIGHTING DEVICE FOR ZIGZAG-OPERATED SHIFT LEVER

BACKGROUND OF THE INVENTION

1. Field of the Invention

The present invention relates to a lighting device for a zigzag-operated shift lever in which the shift lever is shift-operated in accordance with an operation groove having a zigzag pattern.

2. Description of the Related Art

Conventionally, a lighting device for a zigzag-operated shift lever in which the shift lever is shift-operated in accordance with an operation groove having a zigzag pattern is disclosed in Japanese Utility Model Publication No. 4-53481.

As illustrated in FIG. 4, the lighting device for a zigzag-operated shift lever comprises: a case main body 72 which covers a supporting portion 70A of a shift lever 70; a position indicator plate 80 which is assembled to an upper surface open portion 74 of the case main body 72 and includes an operation groove 75 and a position indicator 78, which indicates a shift position of the shift lever 70 along the operation groove 75; and a light bulb 82 which is disposed within the case main body 72 and discharges light for illumination toward the position indicator plate 80. Further, the position indicator plate 80 is formed by a transparent material to which light from the light bulb 82 can be transmitted. In particular, when the light bulb 82 is lit while a vehicle is traveling at night, the light illuminates an area of the position indicator 78, and further, illuminates the peripheral portion of the operation groove 76 due to the repetitive reflections within the plate 80. Moreover, two light bulbs are used in this example (Japanese Utility Model Publication No. 4-53481).

However, in this conventional lighting device for the zigzag-operated shift lever, an upper surface of the position indicator plate 80 other than the area of the position indicator 78 is coated so as to be shaded. In a case in which light is absorbed by the coated surface, the reflected light is weakened, and accordingly, the amount of light to the operation groove 76 is decreased. Consequently, when the light bulb 82 is provided at the driver's seat side, the light can hardly reach the side surface 76B of the operation groove 76 at the front passenger's seat side.

BRIEF SUMMARY OF THE INVENTION

With the aforementioned in view, an object of the present invention is to provide a lighting device for a zigzag-operated shift lever, in which an operation groove for the shift lever is provided at a cover of the shift lever device and in which a position indicator, the side surfaces of the operation groove at the driver's seat side and the front passenger's seat side are illuminated.

The present invention is a lighting device for a zigzag-operated shift lever in which the shift lever, which is pivotably operated in two orthogonal directions, is shift-operated in accordance with a step-shaped operation groove, comprising: a case main body which covers a supporting portion of the shift lever; an indicator plate which is assembled to an upper surface open portion of the case main body and includes the operation groove and a position indicator, which indicates a shift position of the shift lever along the operation groove; and lighting means which is disposed within the case main body and discharges light for illumination toward the indicator plate, wherein the indicator plate is light-transmissible and has a two-layer structure having an upper member, in which the upper surface other than the area of the position indicator is shaded and the position indicator is illuminated by the lighting means, and a lower member, in which the light from the lighting means is transmitted to the peripheral portion of the operation groove at the indicator plate so that the peripheral portion of the operation groove is illuminated.

In accordance with the present invention, when the lighting means is lit, a portion of the light from the lighting means passes through the upper member and penetrates through the area of the position indicator. As a result, the position indicator is luminously indicated. Because nothing shades the upper surface of the lower member, the remaining portion of the light from the lighting means which passes through the lower member of the indicator plate is reliably reflected by the border between the upper and lower members without being absorbed. The light is also reflected by the lower surface of the lower member. Due to the repetitive reflections, the light is transmitted to the peripheral portion of the operation groove and the peripheral portion of the operation groove is illuminated. As a result, the operation groove is luminously indicated.

In the lighting device for the zigzag-operated shift lever relating to the present invention, the indicator plate is light-transmissible. The indicator plate has a two-layer structure having an upper member, in which the upper surface other than the area of the position indicator is shaded and the position indicator is illuminated by lighting means, and a lower member, in which the light from the lighting means is transmitted to the peripheral portion of the operation groove at the indicator plate, and the peripheral portion of the operation groove is illuminated. Consequently, a superior effect is achieved in that the position indicator is illuminated at night and that the light easily reaches the side surface of the operation groove at the front passenger's seat side.

DETAILED DESCRIPTION OF THE PREFERRED EMBODIMENTS

An embodiment of a lighting device for a zigzag-operated shift lever of the present invention will be described in accordance with FIGS. 1 through 3. Note that arrow FR shows a forward direction of a vehicle; arrow D shows a direction of a driver in a transverse direction of the vehicle; and arrow UP shows an upward direction of the vehicle.

Figure 3:
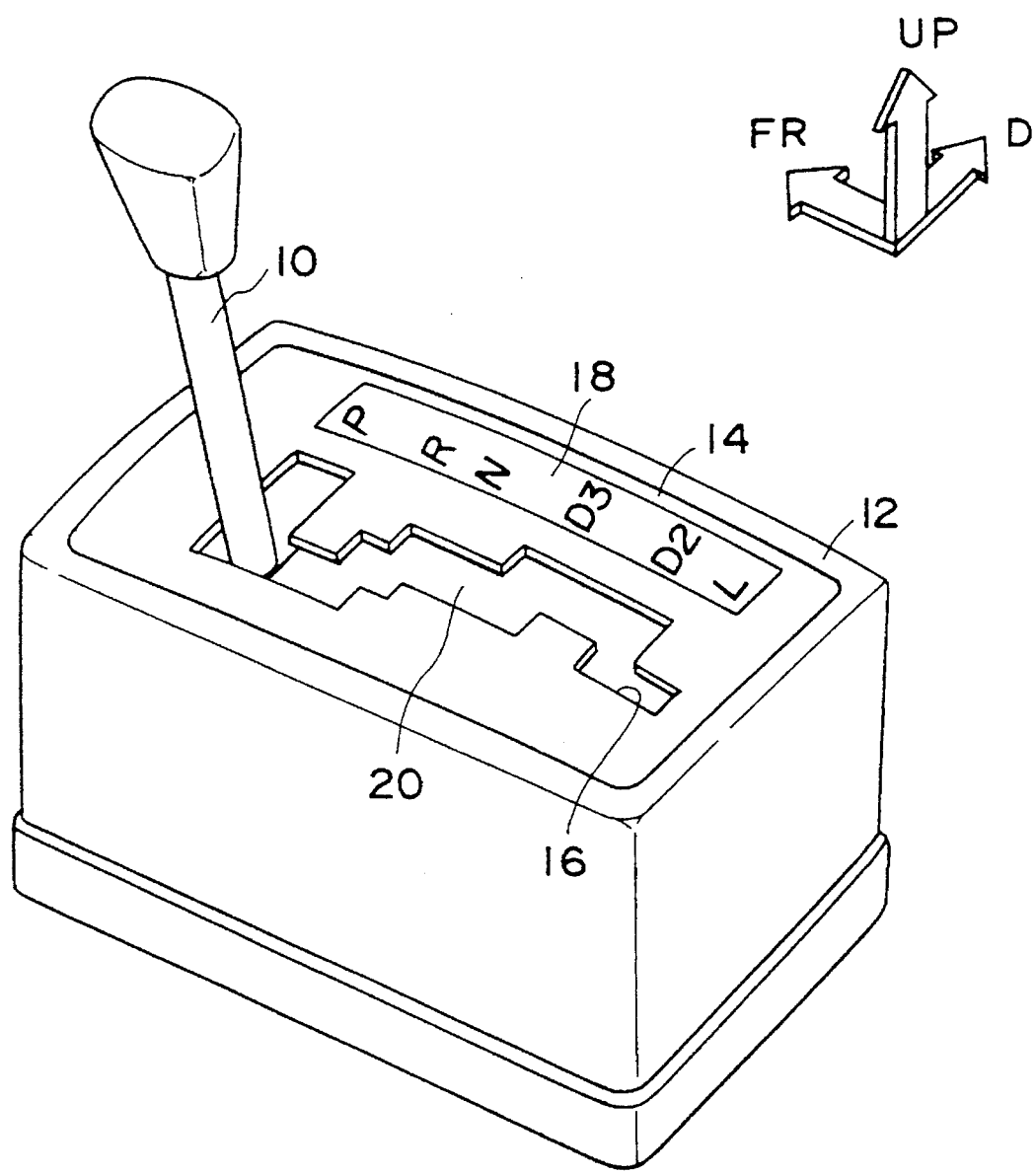
FIG. 3 is a perspective view which, seen from the diagonally rearward direction of a vehicle, shows the lighting device for the zigzag-operated shift lever relating to one embodiment of the present invention.
Figure 4:
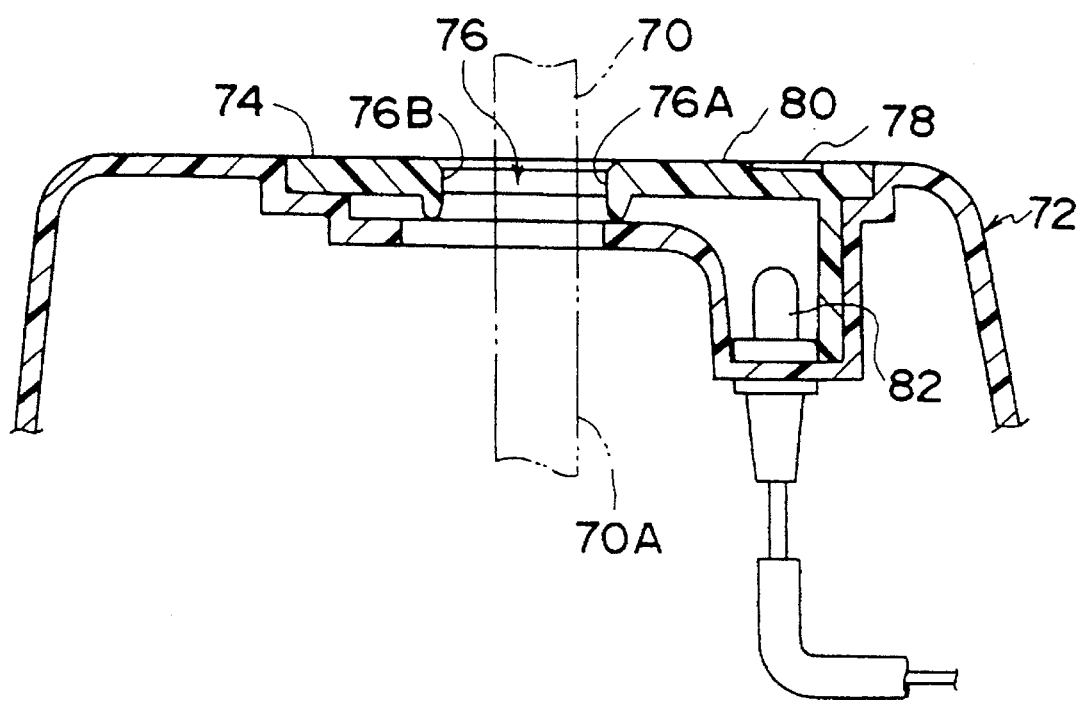
FIG. 4 is a cross-sectional view which corresponds to FIG. 1 and shows a lighting device for a zigzag-operated shift lever relating to a conventional example.

As illustrated in FIG. 3, a supporting portion of a shift lever 10 is covered with a case main body 12. A lower surface of the case main body 12 and a portion of the upper surface thereof are opened, and the case main body 12 is formed in the shape of a box. An indicator plate 14 is assembled to the open portion of the upper surface of the case main body 12.

Figure 2:
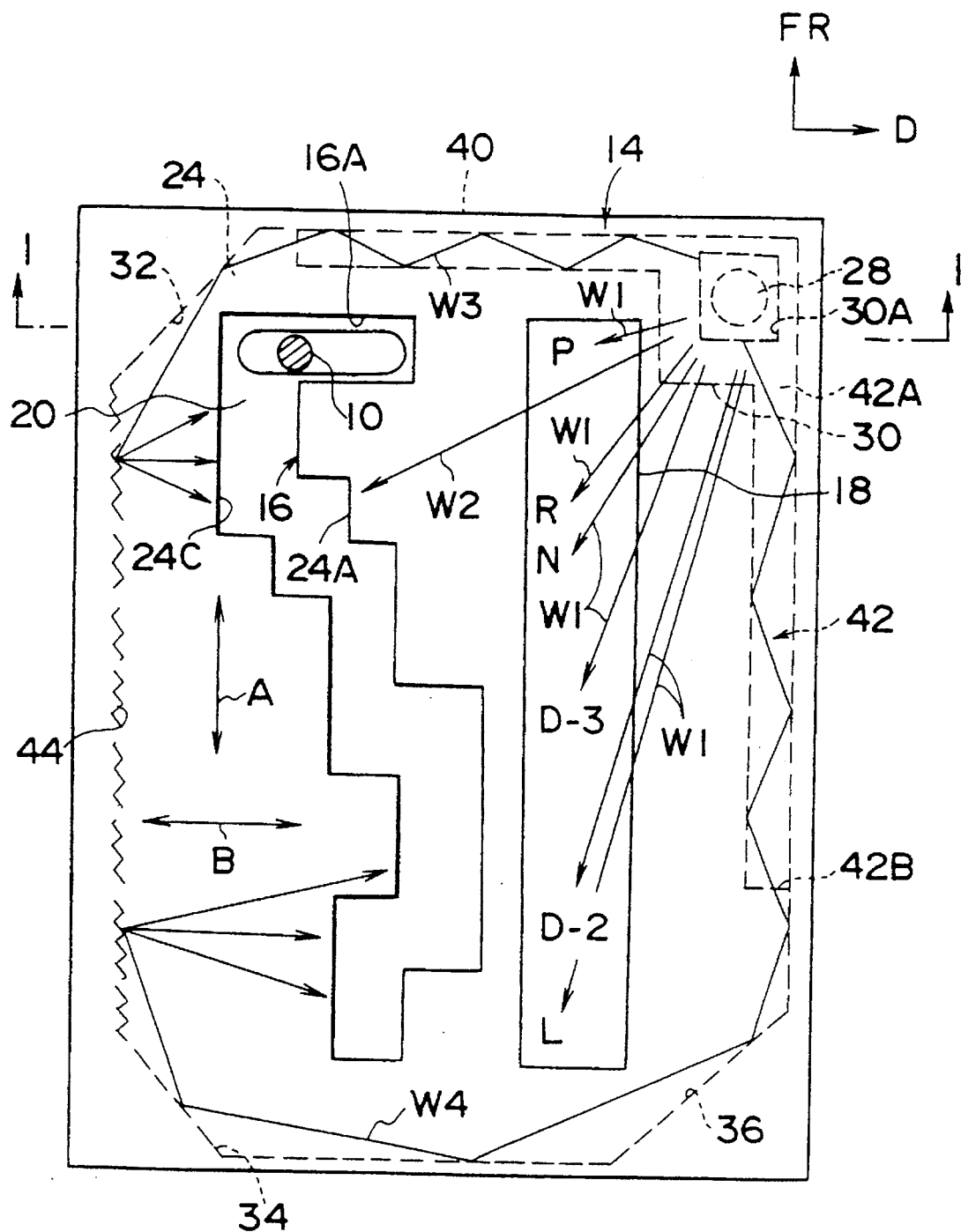
FIG. 2 is a plan view showing a lighting device for a zigzag-operated shift lever relating to an embodiment of the present invention.

As illustrated in FIG. 2, a step-shaped (zigzag patterned) operation groove 16 is formed at the indicator plate 14. The shift lever 10 is inserted through the operation groove 16. The shift lever 10 is shift-operated in the longitudinal direction of the vehicle (the direction of arrow A in FIG. 2) in accordance with the operation groove 16.

A position indicator 18 is formed at the upper surface of the indicator plate 14 along the operation groove 16. Indications of the respective positions (P, R, N, D-3, D-2, L) are provided at the position indicator 18 so as to correspond to the respective shift positions of the shift lever 10. Further, the indicator plate 14 has a guide groove 16A, which extends from the area of P (parking) position (i.e., the position of the shift lever 10 in FIG. 2) of the operation groove 16 to the driver's seat side (i.e., the direction of arrow D).

At the under side of the indicator plate 14, a slide cover 20 is disposed at an area which opposes the operation groove 16. The well-known slide cover 20 interlocks shift operation of the shift lever 10 and slides in the direction of arrow A in FIG. 2. Even if the shift lever 10 is operated to any of the shift positions, the operation groove 16 is kept in a covered state and the entering of dust into the case main body 12 is prevented.

Figure 1:
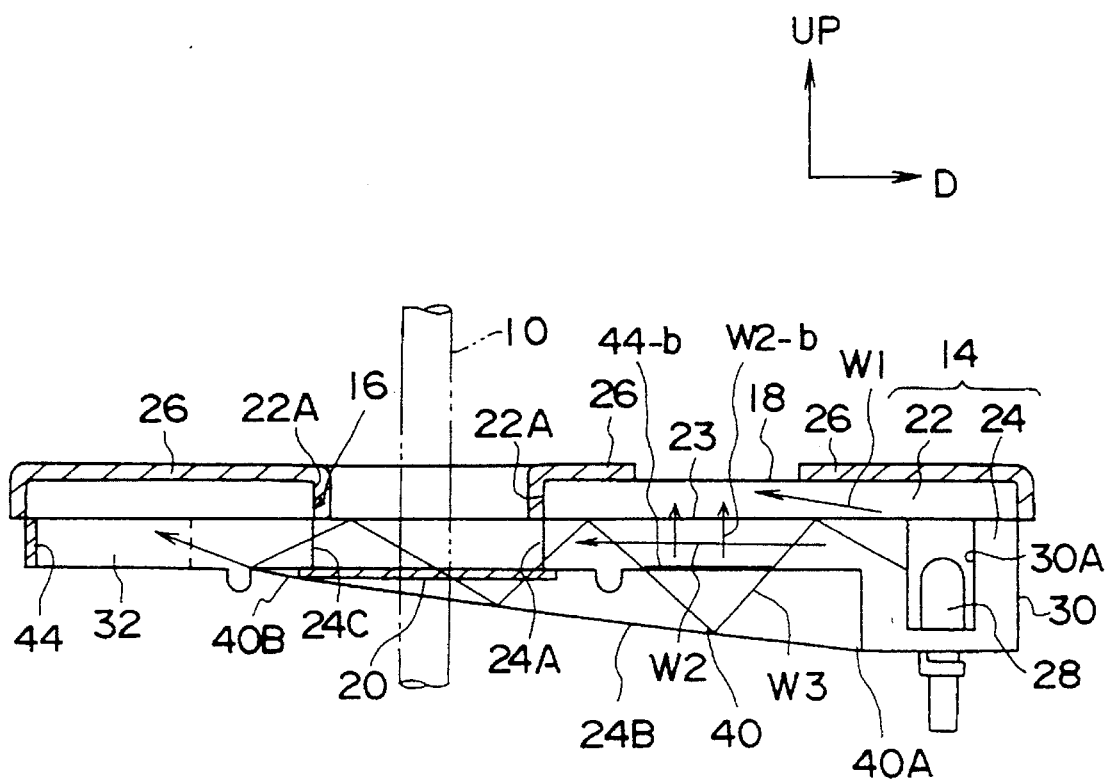
FIG. 1 is a cross-sectional view, taken along a line 1—1 of FIG. 2, in which a portion of a hatching is omitted.

As illustrated in FIG. 1, the indicator plate 14 has a two-layer structure having a character plate 22, which serves as an upper member forming an upper surface portion, and a light-transmissible plate 24, which serves as a lower member forming a lower surface portion. An air layer is interposed at a border 23 between the character plate 22 and the light-transmissible plate 24.

The character plate 22 is formed by a light-transmissible material e.g., a transparent glass, transparent resin or the like. In the present embodiment, the character plate 22 is formed by a transparent acrylic resin. Further, the outer peripheral portion of the character plate 22 includes areas 22A serving as side wall portions of the operation groove 16, and the outer peripheral portion thereof other than the area of the position indicator 18 is coated by a coating 26.

The light-transmissible plate 24 is formed by a light-transmissible material, e.g., a transparent glass, transparent resin or the lira. In the present embodiment, the light-transmissible plate 24 is formed by a transparent acrylic resin.

As illustrated in FIG. 2, a lamp housing 30, which is rectangular when viewed planarly and integrates a light bulb 28 as lighting means, is formed at the front end portion of the light-transmissible plate 24 at the driver's seat side.

As shown in FIG. 1, the lamp housing 30 is integrally formed with the light-transmissible plate 24. One light bulb 28 is upwardly attached to the bottom portion of a concave portion 30A which is opened upwardly.

As illustrated in FIG. 2, reflecting surfaces 32, 34, and 36 are respectively formed at three corners of the four corners of the light-transmissible plate 24 (a reflecting surface is not formed at a corner at which the lamp housing 30 is provided). Moreover, an elongated light-transmissible portion 40 is integrally formed with the front end edge portion of the light-transmissible plate 24, and an elongated light-transmissible portion 42 is integrally formed with the edge portion thereof at the driver's seat side. One end portion of each of the light-transmissible portions 40 and 42 is connected to the lamp housing 30.

As shown in FIG. 1, a portion of the light-transmissible portion 40 projects toward the lower side of the light-transmissible plate 24. The thickness of the light-transmissible portion 40 gradually decreases from a lamp housing side end portion 40A to a reflecting surface side end portion 40B. As a result, the light from the lamp housing side end portion 40A incident on the light-transmissible portion 40 is converged to the reflecting surface side end portion 40B and incident on the reflecting surface 32.

Similarly, as illustrated in FIG. 2, the light from a lamp housing side end portion 42A and incident on the light-transmissible portion 42 is converged to the reflecting surface side end portion 42B and incident on the reflecting surface 36. Moreover, the light reflected by the reflecting surface 36 is incident on the reflecting surface 34.

The end surface of the light-transmissible plate 24 at the front passenger's seat side is a diffusing surface 44. The light from the reflecting surfaces 32 and 34 is diffused over the entire area within the light-transmissible plate 24.

Next, the operation of the present embodiment will be explained.

In the lighting device for the zigzag-operated shift lever of the present embodiment, when the light bulb 28 is lit, a portion of the light from the light bulb 28 (arrow W1 in FIGS. 1 and 2) passes through the light-transmissible plate 24 and the character plate 22 of the indicator plate 14 and penetrates through the area of the position indicator 18. Another portion of the light from the light bulb 28 (arrow W2 in FIGS. 1 and 2) is made to be arrow W2-b in FIG. 1 by a diffusing surface 44-b, which is formed on the surface of the light-transmissible plate 24 for every characters, and penetrates through the area of the position indicator 18. Accordingly, the position indicator 18 is illuminated and thereby luminously indicated.

Further, a portion of the light from the light bulb 28, which passes through the light-transmissible plate 24 of the indicator plate 14 (arrow W2 in FIGS. 1 and 2), penetrates through the wall portion 24A which becomes the side surface of the operation groove 16 at the driver's seat side. Accordingly, the side surface of the operation groove 16 at the driver's seat side is illuminated.

In addition, unlike the conventional structure, since the upper surface of the light-transmissible plate 24 is not coated so as to be shaded, a portion of the light from the light bulb 28, which passes through the light-transmissible plate 24 of the indicator plate 14 (arrow W3 in FIGS. 1 and 2), is reliably reflected by the border 23 between the character plate 22 and the light-transmissible plate 24 and by a lower surface 24B of the light-transmissible plate 24 without being absorbed. Due to the repetitive reflections, the portion of the light is converged within the light-transmissible plate 24 and is incident on the reflecting surface 32.

As illustrated in FIG. 2, the light which is reflected by the reflecting surface 32 (arrow W3 in FIG. 2) is diffused by the diffusing surface 44 so as to be diffused over the entire area of the light-transmissible plate 24. Then, the light penetrates through a wall portion 24C serving as the side surface of the operation groove 16 at the front passenger's seat side so that the side surface of the operation groove 16 at the front passenger's seat side is illuminated.

Similarly, a portion of the light from the light bulb 28, which passes through the light-transmissible portion 42 of the light-transmissible plate 24 of the indicator plate 14 (arrow W4 in FIG. 2), is reflected by the reflecting surfaces 36 and 34. Then, the light is diffused by the diffusing surface 44 so as to be diffused over the entire area of the light-transmissible plate 24. Thereafter, the light penetrates through the wall portion 24C serving as the side surface of the operation groove 16 at the front passenger's seat side so that the side surface of the operation groove 16 at the front passenger's seat side is illuminated.

Accordingly, the side surfaces of the operation groove 16 at the driver's seat side and the front passenger's seat side are luminously indicated.

In the present embodiment, the air layer is interposed at the border 23 between the character plate 22 and the light-transmissible plate 24 so that the portion of the light from the light bulb 28 is reflected by the border 23. However, instead of this structure, a structure may be provided in which the portion of the light from the light bulb 28 is reflected by the border 23 by adhering the character plate 22 to the light-transmissible plate 24 and by changing the refractive indices of the character plate 22 and the light-transmissible plate 24.

As described above, a specific embodiment of the present invention is described in detail. However, it is understood by those skilled in the art that the present invention is not limited to such embodiment and that various other embodiments are possible within the scope of the present invention. For example, in the above-described embodiment, the light bulb is used as lighting means, however, instead of the light bulb, a discharge tube, a light-emitting diode or the like may be used.

What is claimed is:

1. A lighting device for a zigzag-operated shift lever in which the shift lever, which is pivotably operated in two orthogonal directions, is shift-operated in accordance with a step-shaped operation groove, comprising:

a case main body which covers a supporting portion of said shift lever;

an indicator plate which is assembled to an upper surface open portion of said case main body, said indicator plate including said operation groove and a position indicator which indicates a shift position of said shift lever along the operation groove; and lighting means which is disposed within said case main body and discharges light for illumination toward said indicator plate, wherein said indicator plate is light-transmissible and has a two-layer structure, said indicator plate has an upper member, in which the upper surface other than the area of said position indicator is shaded and said position indicator is illuminated by said lighting means, and a lower member, in which the light from said lighting means is transmitted to the peripheral portion of the operation groove at said indicator plate so that the peripheral portion of the operation groove is illuminated.

2. A lighting device for a zigzag-operated shift lever according to claim 1, wherein said lighting means is disposed at a corner portion of said case main body at said position indicator side, said lighting device further includes reflecting means which is disposed at corner portions, other than the corner portion at which said lighting means is disposed, of said case main body, and said reflecting means reflects the light from said lighting means.

3. A lighting device for a zigzag-operated shift lever according to claim 1, wherein the side surface of said lower member at the front passenger's seat side within said case main body is a diffusing surface.

4. A lighting device for a zigzag-operated shift lever according to claim 2, wherein the side surface of said lower member at the front passenger's seat side within said case main body is a diffusing surface.

5. A lighting device for a zigzag-operated shift lever according to claim 1, wherein said lighting means includes a housing portion for integrating said lighting means.

6. A lighting device for a zigzag-operated shift lever according to claim 5, wherein said housing portion is integrally formed with said lower member.

7. A lighting device for a zigzag-operated shift lever according to claim 1, wherein a portion of said lower member includes a diffusing surface so as to illuminate said position indicator.

8. A lighting device for a zigzag-operated shift lever according to claim 1, wherein an air layer is provided between said upper member and said lower member.

9. A lighting device for a zigzag-operated shift lever according to claim 1, wherein said upper member is adhered to said lower member and the refractive indices of said upper and lower members are different.

* * * * *